(12) United States Patent
Raichelgauz et al.

(10) Patent No.: US 9,009,086 B2
(45) Date of Patent: *Apr. 14, 2015

(54) METHOD FOR UNSUPERVISED CLUSTERING OF MULTIMEDIA DATA USING A LARGE-SCALE MATCHING SYSTEM

(71) Applicant: Cortica, Ltd., Ramat Gan (IL)

(72) Inventors: Igal Raichelgauz, New York, NY (US); Karina Odinaev, New York, NY (US); Yehoshua Y. Zeevi, Haifa (IL)

(73) Assignee: Cortica, Ltd., Ramat Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,908

(22) Filed: Jul. 18, 2014

(65) Prior Publication Data

US 2014/0330830 A1    Nov. 6, 2014

Related U.S. Application Data

(63) Continuation of application No. 13/731,906, filed on Dec. 31, 2012, now Pat. No. 8,799,195, which is a continuation of application No. 12/507,489, filed on Jul. 22, 2009, now Pat. No. 8,386,400, which is a
(Continued)

(30) Foreign Application Priority Data

| Oct. 26, 2005 | (IL) | ......................................... | 171577 |
| Jan. 29, 2006 | (IL) | ......................................... | 173409 |
| Aug. 21, 2007 | (IL) | ......................................... | 185414 |

(51) Int. Cl.
*G06F 15/18* (2006.01)
*G06F 17/30* (2006.01)
*G06N 5/02* (2006.01)

(52) U.S. Cl.
CPC ...... *G06F 17/30598* (2013.01); *G06F 17/3028* (2013.01); *G06F 17/30994* (2013.01); *G06F 17/30705* (2013.01); *G06N 5/025* (2013.01)

(58) Field of Classification Search
None
See application file for complete search history.

(56) References Cited

U.S. PATENT DOCUMENTS

| 6,240,423 B1 | 5/2001 | Hirata |
| 6,243,375 B1 | 6/2001 | Speicher |

(Continued)

FOREIGN PATENT DOCUMENTS

| WO | 0231764 | 4/2002 |
| WO | 2007049282 | 5/2007 |

OTHER PUBLICATIONS

Ahonen-Myka http://www.cs.helsinki.fi/u/linden/teaching/irm06/handouts/irom05_7.pdf, 2006, pp. 5.
(Continued)

*Primary Examiner* — Li-Wu Chang
(74) *Attorney, Agent, or Firm* — M&B IP Analysts, LLC

(57) ABSTRACT

A method and system for unsupervised clustering of multimedia content are provided. The method includes generating a plurality of clusters, each cluster containing at least a data element; generating for each of the plurality of clusters a corresponding signature; matching each of the signatures to all other signatures; determining a clustering score for each match; clustering multimedia data elements of each pair of clusters of the plurality of clusters that are determined to have a clustering score above a threshold value to create at least a first cluster; and storing the at least a first cluster in a storage unit.

22 Claims, 6 Drawing Sheets

Related U.S. Application Data continuation-in-part of application No. 12/084,150, filed as application No. PCT/IL2006/001235 on Oct. 26, 2006, now Pat. No. 8,655,801, said application No. 12/507,489 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801.

(56) References Cited

U.S. PATENT DOCUMENTS

| | | | |
|---|---|---|---|
| 6,611,628 | B1 | 8/2003 | Sekiguchi et al. |
| 6,754,435 | B2 | 6/2004 | Kim |
| 6,807,306 | B1 | 10/2004 | Girgensohn et al. |
| 6,819,797 | B1 | 11/2004 | Smith et al. |
| 6,901,207 | B1 | 5/2005 | Watkins |
| 6,937,924 | B1 | 8/2005 | Statler et al. |
| 7,013,051 | B2 | 3/2006 | Sekiguchi et al. |
| 7,031,980 | B2 | 4/2006 | Logan et al. |
| 7,260,564 | B1 | 8/2007 | Lynn et al. |
| 7,302,117 | B2 | 11/2007 | Sekiguchi et al. |
| 7,313,805 | B1 | 12/2007 | Rosin et al. |
| 7,376,572 | B2 | 5/2008 | Siegel |
| 7,450,740 | B2 | 11/2008 | Shah et al. |
| 7,526,607 | B1 * | 4/2009 | Singh et al. ............ 711/118 |
| 2004/0068757 | A1 | 4/2004 | Heredia |
| 2004/0153426 | A1 | 8/2004 | Nugent |
| 2005/0177372 | A1 | 8/2005 | Wang et al. |
| 2006/0236343 | A1 | 10/2006 | Chang |
| 2006/0253423 | A1 | 11/2006 | McLane et al. |
| 2007/0009159 | A1 | 1/2007 | Fan |
| 2007/0074147 | A1 | 3/2007 | Wold |
| 2007/0130159 | A1 | 6/2007 | Gulli et al. |
| 2007/0244902 | A1 | 10/2007 | Seide et al. |
| 2007/0253594 | A1 | 11/2007 | Lu et al. |
| 2007/0268309 | A1 | 11/2007 | Tanigawa et al. |
| 2008/0072256 | A1 | 3/2008 | Boicey et al. |
| 2009/0253583 | A1 * | 10/2009 | Yoganathan ............ 506/9 |
| 2010/0322522 | A1 * | 12/2010 | Wang et al. ............ 382/218 |

OTHER PUBLICATIONS

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Freisleben et al., "Recognition of Fractal Images Using a Neural Network", Lecture Notes in Computer Science, 1993, vol. 6861, 1993, pp. 631-637.

Howlett et al., "A Multi-Computer Neural Network Architecture in a Virtual Sensor System Application", International Journal of Knowledge-based Intelligent Engineering Systems, 4 (2). pp 86-93, 133N 1327-2314.

International Search Authority: "Written Opinion of the International Searching Authority" (PCT Rule 43bis.1) including International Search Report for the related International Patent Application No. PCT/US2008/073852; Date of Mailing: Jan. 28, 2009.

International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; Date of Issuance: Jul. 28, 2009.

International Search Report for the related International Patent Application PCT/IL2006/001235; Date of Mailing: Nov. 2, 2008.

IPO Examination Report under Section 18(3) for corresponding UK application No. GB1001219.3, dated Sep. 12, 2011.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Jaeger, H.: "The "echo state" approach to analysing and training recurrent neural networks", GMD Report, No. 148, 2001, pp. 1-43, XP002466251 German National Research Center for Information Technology.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Maass, W. et al.: "Computational Models for Generic Cortical Microcircuits", Institute for Theoretical Computer Science, Technische Universitaet Graz, Graz, Austria, published Jun. 10, 2003.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Natschlager, T. et al.: "The "liquid computer": A novel strategy for real-time computing on time series", Special Issue on Foundations of Information Processing of Telematik, vol. 8, No. 1, 2002, pp. 39-43, XP002466253.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.

Ribert et al. "An Incremental Hierarchical Clustering", Visicon Interface 1999, pp. 586-591.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

* cited by examiner

|     | $S_1$ | $S_2$ | $S_3$ | $S_4$ | $S_5$ | $S_6$ | $S_7$ | $S_8$ | $S_9$ |
|-----|-------|-------|-------|-------|-------|-------|-------|-------|-------|
| $S_1$ |       | 9     | 0     | 0     | 1     | 1     | 2     | 13    | 0     |
| $S_2$ |       |       | 0     | 0     | 1     | 1     | 0     | 1     | 0     |
| $S_3$ |       |       |       | 5     | 5     | 0     | 0     | 0     | 0     |
| $S_4$ |       |       |       |       | 0     | 0     | 0     | 0     | 0     |
| $S_5$ |       |       |       |       |       | 1     | 17    | 5     | 0     |
| $S_6$ |       |       |       |       |       |       | 0     | 0     | 0     |
| $S_7$ |       |       |       |       |       |       |       | 0     | 13    |
| $S_8$ |       |       |       |       |       |       |       |       | 0     |
| $S_9$ |       |       |       |       |       |       |       |       |       |

FIG. 4

|     | $S_1S_2$ | $S_1S_8$ | $S_3S_4$ | $S_3S_5$ | $S_5S_7$ | $S_5S_8$ | $S_7S_9$ |
|-----|----------|----------|----------|----------|----------|----------|----------|
| $S_1S_2$ |  | X | 0,0<br>0,0 | 0,0<br>1,1 | 1,1<br>2,0 | 1,1<br>13,1 | 2,0<br>0,0 |
| $S_1S_8$ |  |  | 0,0<br>0,0 | 0,1<br>5,0 | 1,2<br>5,0 | X | 2,0<br>0,0 |
| $S_3S_4$ |  |  |  | X | 5,0<br>0,0 | 5,0<br>0,0 | 0,0<br>0,0 |
| $S_3S_5$ |  |  |  |  | X | X | 0,0<br>17,0 |
| $S_5S_7$ |  |  |  |  |  | X | X |
| $S_5S_8$ |  |  |  |  |  |  | 17,0<br>0,0 |
| $S_7S_9$ |  |  |  |  |  |  |  |

FIG. 5

|       | $S_1S_2$ | $S_1S_8$ | $S_3S_4$ | $S_3S_5$ | $S_5S_7$ | $S_5S_8$ | $S_7S_9$ |
|-------|----------|----------|----------|----------|----------|----------|----------|
| $S_1S_2$ |      | X        | 0        | 2        | 4        | 16       | 2        |
| $S_1S_8$ |      |          | 0        | 6        | 8        | X        | 2        |
| $S_3S_4$ |      |          |          | X        | 5        | 5        | 0        |
| $S_3S_5$ |      |          |          |          | X        | 0        | 17       |
| $S_5S_7$ |      |          |          |          |          | X        | X        |
| $S_5S_8$ |      |          |          |          |          |          | 17       |
| $S_7S_9$ |      |          |          |          |          |          |          |

FIG. 6

|             | $S_1S_2$ $S_5S_8$ | $S_1S_8$ $S_5S_7$ | $S_3S_5$ $S_7S_9$ | $S_5S_8$ $S_7S_9$ |
|-------------|-------------------|-------------------|-------------------|-------------------|
| $S_1S_2S_5S_8$ |                   | X                 | X                 | X                 |
| $S_1S_8S_5S_7$ |                   |                   | X                 | X                 |
| $S_3S_5S_7S_9$ |                   |                   |                   | X                 |
| $S_5S_8S_7S_9$ |                   |                   |                   |                   |

FIG. 7

METHOD FOR UNSUPERVISED CLUSTERING OF MULTIMEDIA DATA USING A LARGE-SCALE MATCHING SYSTEM

CROSS-REFERENCE TO RELATED APPLICATIONS

This application is a continuation of U.S. patent application Ser. No. 13/731,906 filed Dec. 31, 2012, now allowed. The Ser. No. 13/731,906 application is a continuation of U.S. patent application Ser. No. 12/507,489 filed Jul. 22, 2009, now U.S. Pat. No. 8,386,400, which is a continuation-in-part of:
  (1) U.S. patent application Ser. No. 12/084,150 filed Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on Jan. 29, 2006; and
  (2) U.S. patent application Ser. No. 12/195,863, filed Aug. 21, 2008, now U.S. Pat. No. 8,326,775, which is a continuation-in-part of the above-referenced U.S. patent application Ser. No. 12/084,150, and which also claims priority under 35 USC 119 from Israeli Application No. 185414, filed on Aug. 21, 2007.

All of the applications referenced above are herein incorporated by reference.

TECHNICAL FIELD

The invention relates generally to clustering of multimedia data elements and, more particularly, to compressing the clusters and matching new content to such clusters.

BACKGROUND

With the abundance of multimedia data made available through various means in general and the Internet and worldwide web (WWW) in particular, there is also a need to provide for effective ways of searching for such multimedia data. Searching for multimedia data in general and video data in particular may be challenging at best due to the huge amount of information that needs to be checked. Moreover, when it is necessary to find a specific content of video, the prior art cases revert to various metadata that describes the content of the multimedia data. However, such content may be complex by nature and not necessarily adequately documented as metadata.

The rapid increase in multimedia databases, accessible for example through the Internet, calls for the application of effective means for search-by-content. Searching for multimedia in general and for video data in particular is challenging due to the huge amount of information that has to be classified. Prior art techniques revert to model-based methods to define and/or describe multimedia data. However, by its very nature, the structure of such multimedia data may be too complex to be adequately represented by means of metadata. The difficulty arises in cases where the target sought for multimedia data is not adequately defined in words, or respective metadata of the multimedia data. For example, it may be desirable to locate a car of a particular model in a large database of video clips or segments. In some cases the model of the car would be part of the metadata but in many cases it would not. Moreover, the car may be at angles different from the angles of a specific photograph of the car that is available as a search item. Similarly, if a piece of music, as in a sequence of notes, is to be found, it is not necessarily the case that in all available content the notes are known in their metadata form, or for that matter, the search pattern may just be a brief audio clip.

A system implementing a computational architecture (hereinafter "The Architecture") that is based on a PCT patent application number WO 2007/049282 and published on May 3, 2007, entitled "A Computing Device, a System and a Method for Parallel Processing of Data Streams", assigned to common assignee, and is hereby incorporated by reference for all the useful information it contains. The Architecture consists of a large ensemble of randomly, independently, generated, heterogeneous processing cores, mapping in parallel data-segments onto a high-dimensional space and generating compact signatures for classes of interest.

A vast amount of multimedia content exists today, whether available on the web or on private networks. Efficiently grouping such multimedia content into groups, or clusters, is a daunting assignment that requires either appropriate metadata for the clustering purposes, or manual completion by identifying commonalities for the clustering purposes. Difficulties arise when portions of multimedia content are not readily recognized for the purpose of clustering. For example, if a picture of the Lincoln Memorial in the sunset is not tagged as such, then only a manual search will enable a user to cluster this image with other pictures of sunsets.

Therefore, it would be advantageous to provide a solution for unsupervised clustering of multimedia content that would cure the deficiencies of prior art techniques.

SUMMARY

Certain embodiments disclosed herein include a method for unsupervised clustering of multimedia content using a large-scale matching system. The method comprises generating a plurality of clusters, each cluster containing at least a data element; generating for each of the plurality of clusters a corresponding signature; matching each of the signatures to all other signatures; determining a clustering score for each match; clustering multimedia data elements of each pair of clusters of the plurality of clusters that are determined to have a clustering score above a threshold value to create at least a first cluster; and storing the at least a first cluster in a storage unit.

Certain embodiments disclosed herein also include a system for unsupervised clustering of multimedia content using a large-scale matching system. The system comprises a processor; a storage unit for storing one or more clusters of multimedia data elements; a memory coupled to the at least one processing unit, the memory contains instructions that, when executed by the processor, configure the system to: generate a plurality of clusters, each cluster containing at least a data element; generate for each of the plurality of clusters a corresponding signature; match each of the signatures to all other signatures; determine a clustering score for each match being performed; cluster multimedia data elements of each pair of clusters of the plurality of clusters having a clustering score above a threshold value to create at least a first cluster; and store the at least a first cluster in the storage unit.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

FIG. 4 is a diagonal matrix showing the matches found between multimedia data elements.

FIG. 5 is a diagonal matrix showing first level clusters of matched multimedia data elements.

FIG. 6 is a diagonal matrix showing the cumulative match score for the clusters.

FIG. 7 is a diagonal matrix showing a second level of clustering.

DETAILED DESCRIPTION

Figure 1:
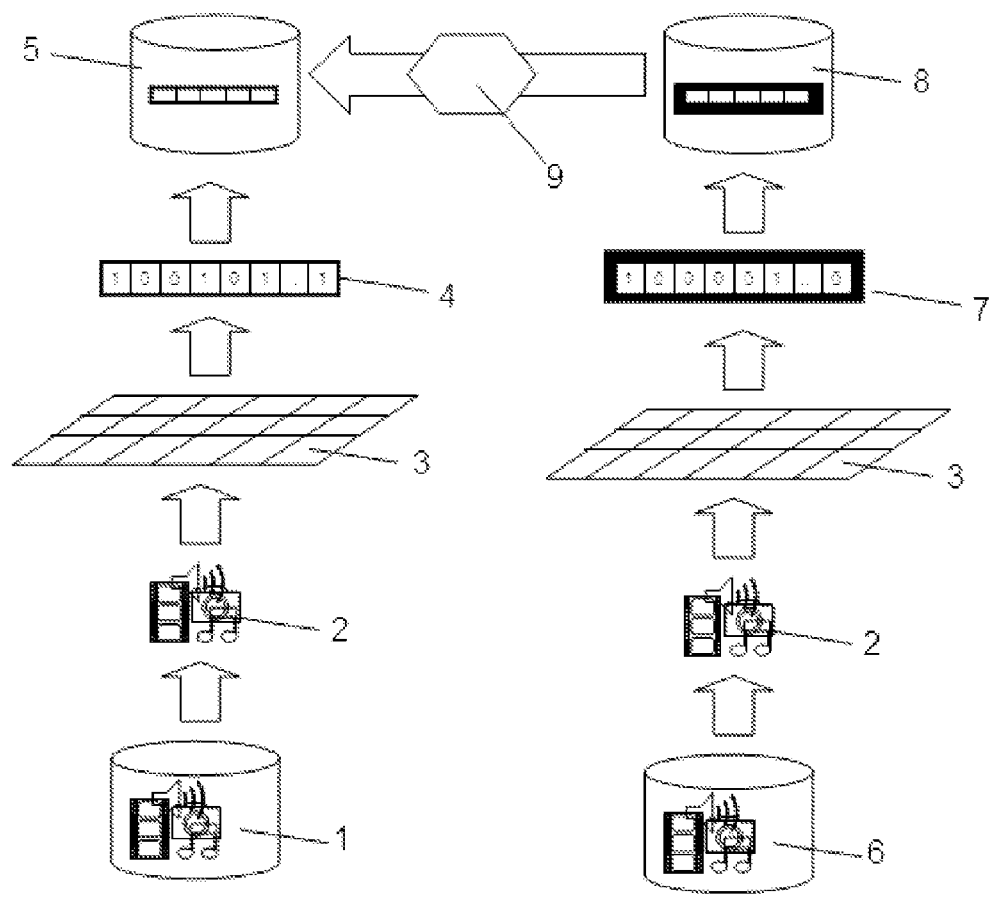
FIG. 1 is a block diagram showing the basic flow of The System for large-scale multimedia matching.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

A large collection of multimedia data elements calls for clustering of the multimedia data. Accordingly to certain exemplary embodiments, multimedia data elements are clustered in an unsupervised manner. The disclosed embodiments describe a clustering technique which entails one comparison of every one of the multimedia data elements to all other multimedia data elements and determining a comparison score. Based on the determination, multimedia data elements having a score above a predetermined threshold are clustered. The process is then repeated for the clusters as they become larger clusters until a cycle where no more clustering can be achieved. In one embodiment instead of the multimedia data elements, the initial comparison is performed on Signatures that are unique to the multimedia data elements. The representation in clusters and clusters of clusters enables compression, storage and discovery of new content-related elements by matching to the generated clusters.

In one embodiment, instead of the multimedia data elements that include, but are not limited to, images, audio, video, fragments thereto, and any combination thereof, the initial comparison is performed on Signatures unique to the multimedia data elements. The comparison between all the pairs of the multimedia data elements' signatures yields the Inter-Match Matrix. The clustering is performed on this Inter-Match Matrix which is a sparse matrix. This process results in Clusters of Signatures. It should be noted that the same Signature can be related to more than one element, and several signatures can represent a single element. Thus, the clustering of the Signatures and the representation of the Cluster by a reduced set of signatures, which optimally spans the Cluster, enables reduced storage and effective representation for discovery of new content-elements related to the cluster. For example, a specific combination of Signatures in the Cluster may lead to a match of new content-elements which were not originally part of the set the Cluster was based on. The method can be implemented in any applications which involve large-scale content-based clustering, recognition and classification of multimedia data. These applications include, but are not limited to, content-tracking, video filtering, multimedia taxonomy generation, video fingerprinting, speech-to-text, audio classification, object recognition, video search and any other applications that require content-based signatures generation and matching for large content volumes such as, web and other large-scale databases.

Certain embodiments of the invention include a framework, a method, a system and their technological implementations and embodiments, for large-scale matching-based multimedia Deep Content Classification (DCC). The system is based on an implementation of a computational architecture, "The Architecture" referenced above. The Architecture consists of a large ensemble of randomly, independently, generated, heterogeneous processing computational cores, mapping in parallel data-segments onto a high-dimensional space and generating compact signatures for classes of interest.

In accordance with certain principles of the disclosed embodiments, a realization of The Architecture embedded in large-scale matching system (hereinafter "The System") for multimedia DCC may be used. The Architecture receives as an input stream, multimedia content segments, injected in parallel to all computational cores. The computational cores generate compact signatures for each specific content segment, and/or for a certain class of equivalence and interest categorizing content-segments. For large-scale volumes of data, the signatures are stored in a database of size N (where N is an integer number), allowing match between the generated signatures of a certain content-segment and the signatures in the database respective of complexity and response time.

For the purpose of explaining the principles of the invention there is now demonstrated an embodiment of The System. Other embodiments are described in the patent applications which of which this patent application is a continuation-in-part of and are specifically incorporated herein by reference. Moreover, it is appreciated that other embodiments will be apparent to one of ordinary skill in the art.

Characteristics and advantages of the System include, but are not limited to: The System is flat and generates signatures at an extremely high throughput rate; The System generates robust natural signatures, invariant to various signal distortions; The System is highly-scalable for high-volume signatures generation; The System is highly-scalable for matching against large-volumes of signatures; The System generates Robust Signatures for exact-matching and/or partial-matching with low-cost, in terms of complexity and response time; The System accuracy is scalable versus the number of computational cores, with no degradation effect on the throughput rate of processing; The throughput of The System is scalable with the number of computational threads, and is scalable with the platform for computational cores implementation, such as FPGA, ASIC, etc.; and, the signatures produced by The System are task-independent, thus the process of classification, recognition and clustering can be done independently from the process of signatures generation, in the superior space of the generated signatures.

Large-Scale Video Matching System—the System

The goal of a large-scale video matching system is effectively to find matches between members of large-scale Master DB of video content-segments and a large-scale Target DB of video content-segments. The match between two video content segments should be invariant to a certain set of statistical distortions performed independently on two relevant content-segments. Moreover, the process of matching between a certain content-segment from Master DB to Target DB consisting of N segments, cannot be accomplished by matching directly the Master content-segment to all N Target content-segments directly for large-scale values of N, since such a complexity of O(N), will lead to non-practical response times. Thus, the representation of content-segments by both Robust Signatures and Signatures is critical application-wise. The System embodies, but is not limited to, a specific realization of The Architecture for the purpose of Large-Scale Video Matching System.

A high-level description of the process for large-scale video matching is depicted in FIG. 1. The multimedia content segments (2) from Master and Target databases (6) and (1) are processed in parallel by a large number of independent computational Cores (3) that constitute the Architecture. Further details are provided in the cores generator for Large-Scale Video Matching System section below. The independent Cores (3) generate a Robust Signatures and Signatures (4) for Target content-segments and a Robust Signatures and Signatures for Master content-segments, which are further saved in a Master Robust Signatures and Signatures (5), and Robust Signatures and Signatures (8). An exemplary and non-limiting process of signature generation for an audio component is shown in detail in FIG. 2. Finally, Target Robust Signatures and/or Signatures are effectively matched, by a matching algorithm (9), to Master Robust Signatures and/or Signatures database to find all matches between the two databases.

To demonstrate an example of a signature generation process, it is assumed, merely for the sake of simplicity and without limitation on the generality of the disclosed embodiments, that the signatures are based on a single frame, leading to certain simplification of the computational cores generation. This is further described in the cores generator for Large-Scale Video Matching System section. The system is extensible for signatures generation capturing the dynamics in-between the frames.

Signature Generation

Figure 2:
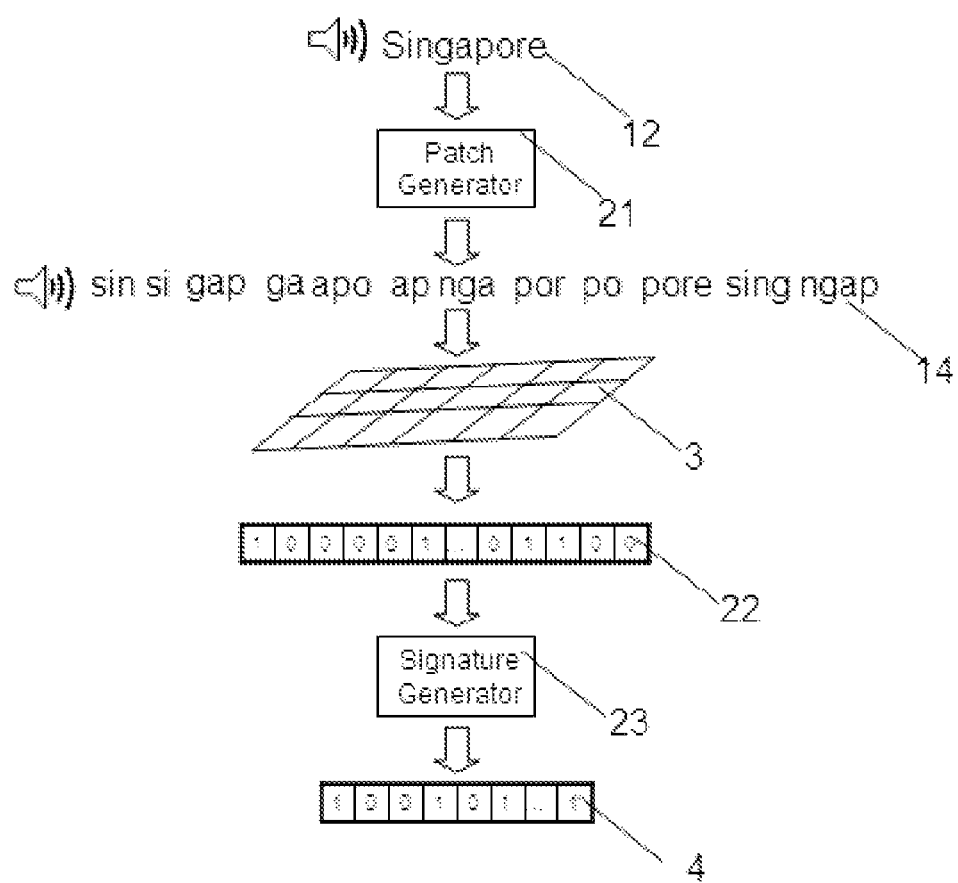
FIG. 2 is a diagram showing the flow of patches generation, response vector generation, and signature generation in a Large-Scale Speech-to-Text System implemented in accordance with various embodiments.

The signatures generation process will be described with reference to FIG. 2. The first step in the process of signatures generation from a given speech-segment is to break-down the speech-segment to K (where K is an integer equal to or greater than 1) patches (14) of random length P (where P is an integer equal to or greater than 1) and random position within the speech segment (12). The break-down is performed by the patch generator component (21). The value of K and the other two parameters are determined based on optimization, considering the tradeoff between accuracy rate and the number of fast matches required in the flow process of the System. In the next step, all the K patches are injected in parallel to all L (where L is an integer equal to or greater than 1) computational Cores (3) to generate K response vectors (22). The Signature (4) is generated by the signature generator (23).

Creation of Signature Robust to Statistical Noise

In order to generate Robust Signatures, i.e., Signatures that are robust to additive, Gaussian, or other linear and non-linear noise L of computational cores, generated for Large-Scale Video Matching System are used. A frame i is injected to all the cores. The cores generate two binary response vectors $\vec{S}$—the Signature, and $\vec{RS}$—Robust Signature.

For generation of signatures robust to additive noise, such as White-Gaussian-Noise, scratch, etc., but not robust to distortions, such as crop, shift and rotation, the core $C_i = \{n_i\}$ may consist of a single (LTU) node or more nodes. The node equations are:

$$V_i = \sum_j w_{ij} k_j$$

$$n_i = \theta(V_i - Th_x);$$

Wherein $\theta$ is a Heaviside step function; $w_{ij}$-coupling node unit (CNU) between node i and image component j (for example, grayscale value of a certain pixel j); $k_j$ is an image component j (for example, grayscale value of a certain pixel j); $Th_x$ is a constant Threshold value where x is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the threshold for Signature $Th_S$ and the threshold for Robust Signature $Th_{RS}$ are set apart, after optimization, according to the following criteria:

I: For: $V_i > Th_{RS}$ $$1 - p(V > Th_S) - 1 - (1-\epsilon)^l \ll 1$$

i.e., given that l nodes (cores) constitute a Robust Signature of a certain image I, the probability that not all of these l nodes will belong to the Signature of same, but noisy image, $\tilde{I}$ is sufficiently low (according to a system's specified accuracy).

II: $p(V_i > Th_{RS}) \approx l/L$ i.e., approximately l out of the total L nodes can be found to generate Robust Signature according to the above definition.

III: Both Robust Signature and Signature are generated for certain frame i.

It should be understood that the creation of a signature is a unidirectional compression where the characteristics of the compressed data are maintained but the compressed data cannot be reconstructed. Therefore, a signature can be used for the purpose of comparison to another signature without the need for comparison with the original data. The detailed description of the signature generation is discussed in more detail in the pending patent applications of which this patent application is a continuation-in-part of, and is hereby incorporated by reference.

Computational Cores Generation

Cores Generation is a process of definition, selection and tuning of the Architecture parameters for a certain realization in specific system and application. The process is based on several design considerations, such as:

(a) The cores should be designed so as to obtain maximal independence, i.e. the projection from a signal space should generate a maximal pair-wise distance between any two cores' projections in a high-dimensional space.

(b) The cores should be optimally designed for the type of signals, i.e. the cores should be maximally sensitive to the spatio-temporal structure of the injected signal, for example, and in particular, sensitive to local correlations in time and space. Thus, in some cases a core represents a dynamic system, such as in states' space, phase space, edge of chaos, etc., which is uniquely used herein to exploit their maximal computational power.

(c) The cores should be optimally designed with regard to invariance to set of signal distortions.

Unsupervised Clustering

Figure 3:
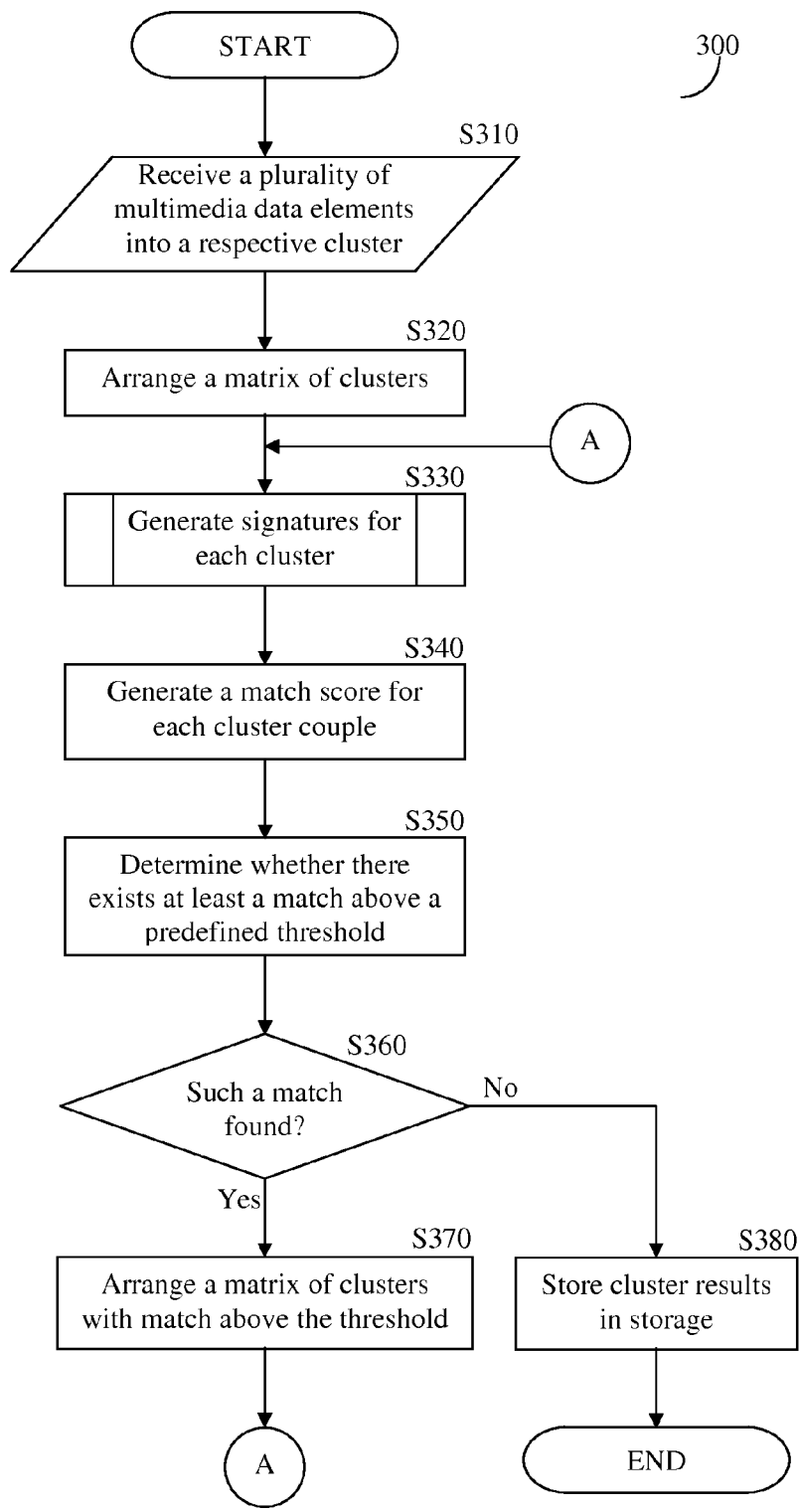
FIG. 3 is a flowchart of a method for unsupervised clustering based on a signature matching using The Architecture.

FIG. 3 shows an exemplary and non-limiting flowchart 300 illustrating a method for unsupervised clustering implemented in accordance with an embodiment. In an exemplary embodiment, the method is based on signature matching that makes use of the Architecture. As noted above a multimedia data element may be, but is not limited to, a video, a video frame, a video clip, a picture, an audio recording, and other kinds of multimedia data elements, as well as portions and/or combinations thereof. It should be further noted that the received multimedia data element may also be a portion of a full image, for example, without limitation, a logo that is shown on certain television shows, or a cartoon character used in a movie, and the like, and is not limited to visual images.

In S310, a plurality of multimedia data elements is received. In S320, the multimedia data elements are arranged in a diagonal two-dimensional matrix. Arrangement of multimedia data elements in a diagonal two-dimensional matrix is described further herein below with respect to FIGS. 4 through 7. Initially, each entry in the matrix is a cluster that comprises a single multimedia data element. In S330, signatures are generated for each of the received plurality of multimedia data elements. The signatures are generated as explained in more detail herein above with respect to FIG. 2, as well as in the co-pending patent applications of which this patent application is a continuation-in-part of. One of the signatures may be a Robust Signature.

In S340, matches are performed between each signature of a cluster in the rows of the matrix and the signatures of the other clusters, and the match result value respective of each signature of the cluster is stored in the appropriate cell of the matrix. It should be noted that a multimedia data element or cluster is not matched to itself, i.e., a signature is not matched to itself, and in the case of a cluster, two clusters will not be matched if the same element is present in the two clusters being compared. In S350, it is determined whether there is at least one match that is above a predetermined threshold. It should be noted that as the process is an iterative process, that a different threshold value may be used as iterations advance.

In S360, if a match is above or equal to a predetermined threshold, then execution continues with S370; otherwise, execution continues with S380 which causes, for example, the storage of the matrix results in a storage, or sending a report to the system of completion of the determination of the unsupervised clustering process. In S370, clusters are formed from the clusters that were determined to be above the predetermined threshold. These new clusters are now arranged in a matrix similar to the initial matrix but containing fewer rows and columns as a result of the clustering process. An exemplary initial cluster is shown in FIG. 4 and an exemplary secondary cluster, comprising a cluster of clusters is provided, for example in FIG. 5. In one embodiment, signatures are not generated for the multimedia data elements and comparison is performed directly between the multimedia data elements.

The advantages of using the signatures for the purpose of the clustering process include the speed in which such comparison can be performed as well as the lesser amount of resources required. Furthermore, the process using signatures is highly scalable and advantageous due to the ever increasing amounts of multimedia data elements being made available. It should be further noted that it is easy to add an additional multimedia data element once the initial matrix has been created. When applicable, a signature of the newly added multimedia data element may be created. A row and a column are added to the matrix and the clustering process described above is repeated. Similarly, removal of a multimedia data element requires only the removal of the respective row and column of that multimedia data element from the matrix, as well as repetition of the clustering process.

Reference is now made to FIGS. 4 through 7, where exemplary and non-limiting tables of the clustering process in accordance with the disclosed embodiments are shown. In FIG. 4, signatures S1 through S9 are matched and, for each match, a score of the level of the match is provided. For example, it is determined that the score for the match between S1 and S2 is "9" while the score of the match between S5 and S8 is "5". According to the process, a threshold is now applied to determine which two signatures will be clustered together. Assuming a threshold value of "4", then while S3 and S4 will be grouped in a cluster as the matching score respective thereof exceeds the threshold. S5 and S6 are not clustered because their score is lower than the threshold. A group of seven clusters is therefore identified based on this criteria and such clusters are: {S1,S2}, {S1,S8}, {S3,S4}, {S3,S5}, {S5, S7}, {S5,S8} and {S7,S9}.

FIG. 5 now shows the results of matches between the selected clusters, where no cluster is matched to itself and each matching occurs only once. Furthermore, in accordance with an embodiment, two items are not matched if a signature Si (wherein I is an integer such that i=1, 2, . . . , 9) is present in both clusters being matched. For example, the clusters {S1,S2} and {S1,S8} are not matched because the signature S1 appears in both. This is denoted by an "X" to show that no matching is made. Where matches take place, the score from the table shown in FIG. 4 is entered, such that, for each entry, there will be four score values. For example, in the entry for the pair {S1,S2} and {S3,S4} the values "0,0,0,0" are entered, while for {S1,S2} and {S5,S8} the values "1,1,13,1" are entered.

FIG. 6 now shows the cumulative score result where the scores entered into each entry are summed up. In this example, the score for the pairs {S1,S2} and {S3,S4} is "0," while the score for the pairs {S1,S2} and {S5,S8} is "16". The clustering process may then continue for another iteration. Assuming a threshold value of "8", i.e., only clusters that have a score of 8 or more may be clustered, it can be seen that only four new clusters can be achieved: {S1, S2, S5, S8} having a score of "16", {S1, S8, S5, S7} having a score of "8", {S3, S5, S7, S9} having a score of "17" and {S5,S8, S7,S9} also having a score of "17". Now the process of a 4×4 matrix takes place and shown in FIG. 7. As can be seen in all combinations, there is a repeat of at least one signature in two clusters that are to be matched because, in this case, no score is determined for all locations marked with an "X". However, in other embodiments, it is possible that this would not have occurred. In such a case, the score would have been determined and checked against the prevailing threshold for that iteration. The process ceases when it is no longer possible to create new clusters which will happen once a single cluster is created, or when it is not possible to have any more matches, or the match is otherwise found to be below a defined threshold value.

The unsupervised clustering process maps a certain content-universe onto a hierarchical structure of clusters. The content-elements of the content-universe are mapped to signatures, when applicable. The signatures of all the content-elements are matched to each other and, consequently, such matching generates the inter-match matrix. The described clustering process leads to a set of clusters. According to one embodiment, each cluster is represented by a small/compressed number of signatures, for example signatures generated by The Architecture as further explained hereinabove with respect to FIG. 1, which can be increased by variants. This structure results in a highly compressed representation of the content-universe.

In one embodiment, a connection graph between the multimedia data elements of a cluster may be stored. The graph may be used to assist a user searching for data to move along the graph in the search of a desired multimedia data element. In another embodiment, upon determination of a cluster, a signature for the whole cluster may be generated based on the signatures of the multimedia data elements that belong to the cluster. It should be appreciated that a Bloom filter may be used to reach such signatures. Furthermore, as the signatures in accordance with the principles of the disclosed invention are correlated to some extent, the hash functions of the Bloom filter may be replace by simpler pattern detectors, with the Bloom filter being the upper limit.

While signatures are used here as the basic data elements merely for the sake of simplicity, it should be realized that other data elements may be clustered using the principles of the disclosed embodiments. For example, a system generating data items is used, where the data items generated may be clustered according to the disclosed principles. Such data elements may be, without limitation, multimedia data elements. The clustering process may be performed by dedicated hardware or using a computing device having storage to store the data elements generated by the system and then performing the process described herein above. The clusters can be stored in memory for use as may be deemed necessary.

The various disclosed embodiments may be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosed embodiments and the concepts contributed by the inventor to furthering the art, and should be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for unsupervised clustering, comprising:
    generating a plurality of clusters, each cluster containing at least a data element;
    generating for each of the plurality of clusters a corresponding signature, wherein a signature is generated from multiple patches of a multimedia data element, wherein multiple patches are of random length and random position within the multimedia data element;
    matching each of the signatures to all other signatures;
    determining a clustering score for each match;
    clustering multimedia data elements of each pair of clusters of the plurality of clusters that are determined to have a clustering score above a threshold value to create at least a first cluster; and
    storing the at least a first cluster in a storage unit.

2. The computerized method of claim 1, further comprising:
    repeating the steps from generating for each of the plurality of clusters a corresponding signature, wherein each of the plurality of clusters are the at least a first cluster.

3. The computerized method of claim 1, further comprising:
    stopping the generation of the at least a first cluster when it is determined that a single cluster cannot be reached.

4. The computerized method of claim 2, wherein repeating the generation of the new cluster further comprising:
    generating a N-th cluster from previously generated clusters, wherein N is any integer number greater than one.

5. The computerized method of claim 1, wherein the clustering score is determined to be below the threshold value if two clusters of the previously generated clusters include at least one overlapping data element or a data element is matched to itself.

6. The computerized method of claim 1, wherein a single cluster cannot be reached when no two multimedia data elements have a clustering score above the threshold value or when no two previously clustered elements have a clustering score above the threshold.

7. The computerized method of claim 1, wherein each of the multimedia data elements is at least one of: audio, image, video, a video frame, fragment of audio, fragment of image, fragment of video, a fragment of a video frame, and an image of a signal.

8. The computerized method of claim 7, wherein the image of a signal is at least one of: a medical signal, a geophysical signal, a subsonic signal, a supersonic signal, an electromagnetic signal, and an infrared signal.

9. The computerized method of claim 1, wherein each signature is generated by a plurality of computational cores enabled to receive a plurality of data elements, each computational core having properties independent from the other computational cores.

10. The computerized method of claim 9, wherein each computational core is configured to generate a respective first signature element and a respective second signature element responsive to a data element, the first signature element being a robust signature.

11. The computerized method of claim 9, further comprising:
    setting the properties of each of the plurality of computational cores to have at least some statistical independency from each of the other cores of the plurality of computational cores, the properties being set independently of each other core.

12. The computerized method of claim 1, wherein generating the respective signature further comprising:
    applying a Bloom filter on signatures of data elements in a cluster of the multimedia data elements.

13. The computerized method of claim 12, wherein applying the Bloom filter comprising:
    detecting a pattern of the signatures of multimedia data elements of the cluster.

14. A non-transitory computer readable medium containing instructions that, when executed, perform the method of claim 1.

15. An apparatus for unsupervised clustering, comprising:
    at least one processing unit;
    a storage unit for storing one or more clusters of multimedia data elements;

a memory coupled to the at least one processing unit, the memory contains instructions that, when executed by the at least one processing unit configure the apparatus to:

generate a plurality of clusters, each cluster containing at least a data element;

generate for each of the plurality of clusters a corresponding signature, wherein a signature is generated from multiple patches of a multimedia data element, wherein multiple patches are of random length and random position within the multimedia data element;

match each of the signatures to all other signatures;

determine a clustering score for each match being performed;

cluster multimedia data elements of each pair of clusters of the plurality of clusters having a clustering score above a threshold value to create at least a first cluster; and store the at least a first cluster in the storage unit.

16. The apparatus of claim 15, wherein the at least one processing unit is further configured to:

repeat the steps from generate for each of the plurality of clusters a corresponding signature, wherein each of the plurality of clusters are the at least a first cluster.

17. The apparatus of claim 15, wherein the processing unit is further configured to:

stop the generation of the at least a first cluster when it is determined that a single cluster cannot be reached.

18. The apparatus of claim 16, wherein the processing unit is further configured to:

generate a N-th cluster from previously generated clusters, wherein N is any integer number greater than one.

19. The apparatus of claim 15, wherein the clustering score is below the threshold value if two clusters of the previously generated clusters include at least one overlapping multimedia data element or a multimedia data element is matched to itself.

20. The apparatus of claim 15, wherein each of the data elements is at least one of: audio, image, video, a video frame, fragment of audio, fragment of image, fragment of video, a fragment of a video frame, and an image of a signal.

21. The apparatus of claim 20, wherein the image of a signal is at least one of: a medical signal, a geophysical signal, a subsonic signal, a supersonic signal, an electromagnetic signal, and an infrared signal.

22. The apparatus of claim 15, further comprising:

a plurality of computational cores enabled to receive a plurality of data elements, each computational core having properties independent from the other computational cores, wherein each computational core generates a respective first signature element and a respective second signature element responsive to a multimedia data element, the first signature element being a robust signature.

* * * * *